May 20, 1969   J. R. LEFTWICH   3,445,677
TEMPERATURE CONTROLLING AND INDICATING DEVICE
Filed March 4, 1966

INVENTOR
JAMES R. LEFTWICH
BY
ATTORNEY

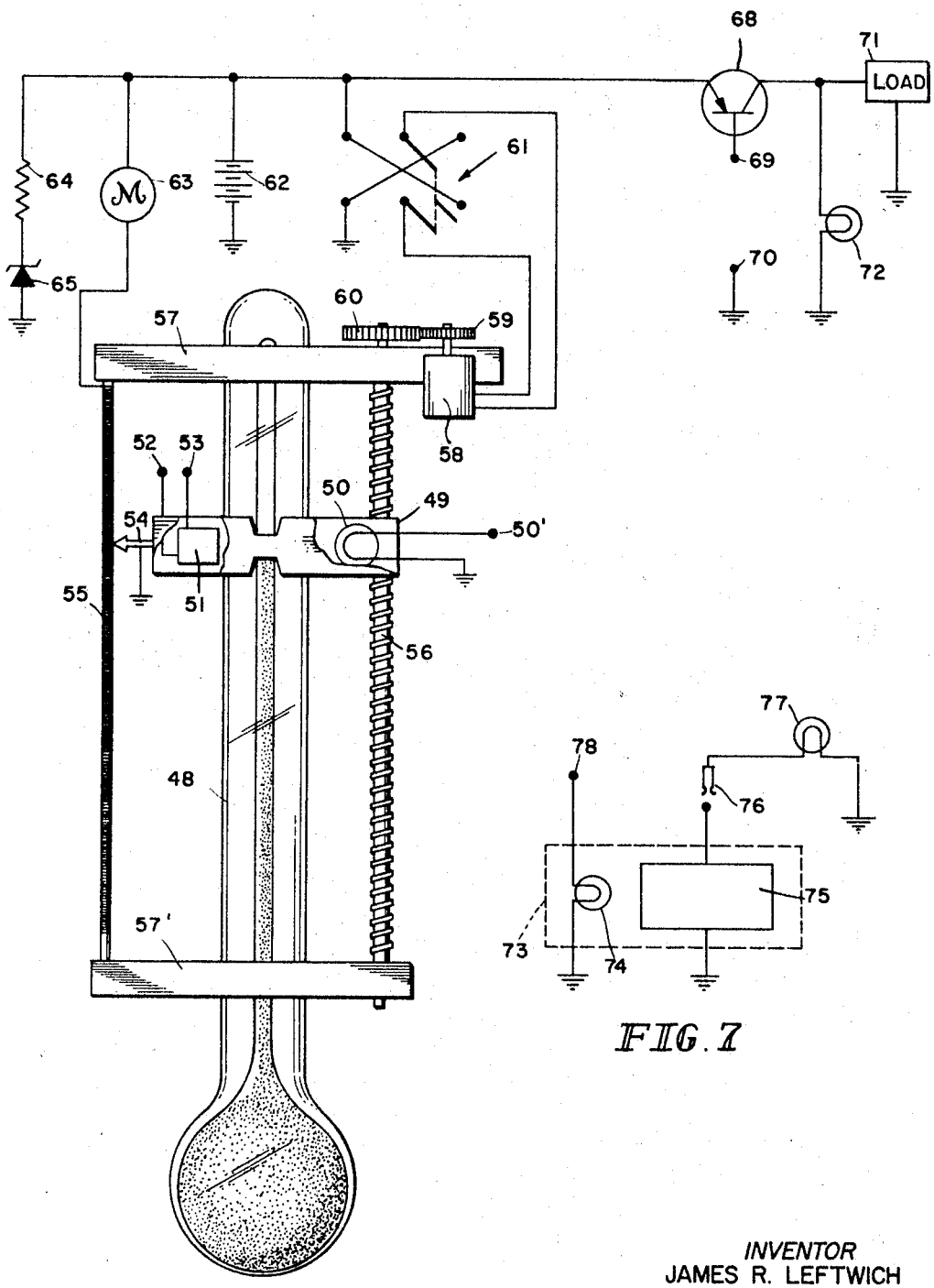

United States Patent Office 3,445,677
Patented May 20, 1969

3,445,677
TEMPERATURE CONTROLLING AND
INDICATING DEVICE
James R. Leftwich, Indianapolis, Ind., assignor to P. R.
Mallory & Co. Inc., Indianapolis, Ind., a corporation of
Delaware
Filed Mar. 4, 1966, Ser. No. 531,806
Int. Cl. H02b 1/24
U.S. Cl. 307—117                                         7 Claims

ABSTRACT OF THE DISCLOSURE

A thermometer having a capillary tube filled with an opaque liquid is provided with a slidable member containing a light source and a light-actuated device on opposite sides of the capillary tube. The continuously energized light source operates the light-actuated device when the opaque liquid falls below a predetermined level, in order to control a load device. A driven, threaded shaft may be included to move the slidable member along the thermometer. The member may then be provided with a potentiometer input for a remote electrical indication of the temperature displayed by the thermometer.

The present invention relates to temperature controlling and indicating devices and more particularly to the means and methods for providing such devices having a thermometer as the basic temperature sensing element.

There are many requirements for temperature control devices which will operate over wide temperature ranges, e.g. from 0 to 100° C. Bimetallic devices which will operate over such a wide range are not very accurate. Also, as bimetallic devices are used, their accuracy is affected by changes in the atmospheric conditions and by contact wear. Other types of devices, such as temperature sensitive resistors and semiconductors which will operate accurately over such a wide range of temperature are also not available.

Accordingly, there is presented in this specification a temperature controlling and indicating device which will operate accurately over a wide temperature range and which can be easily fabricated and used.

The temperature control device of the present invention is characterized by a thermometer having a capillary tube containing an opaque material and a member having a light emitting device and a light actuated device disposed therein, said member being slidably mounted on said thermometer. The light emitting device, which is continually energized in operation, is on one side of the capillary tube and the light actuated device is on the opposite side. Depending on the position of the slidable member on the thermometer and the height of the opaque material in the capillary tube, the light actuated device may or may not be actuated by light emitting from the light emitting device. Therefore, by adjusting the slidable member up and down the thermometer, different temperatures for actuating the light actuated device can be selected. In an illustrative embodiment of the present invention, there is a means for remotely controlling the position of the slidable member on the thermometer.

The slidable member of the present invention can be adapted to work with many thermometers that are presently being manufactured and used. Also, the output of the light actuated device of the present invention can be applied to a variety of output circuits for energizing a load when the light actuated device is actuated. The load may be either a heater or cooler or a relay for controlling a heater or cooler. Therefore, the present invention is a versatile and accurate temperature controlling and indicating device which will operate over the range of temperature of most thermometers.

Other features of the present invention will become apparent as this specification progresses.

It is an object of the present invention, therefore, to provide a temperature controlling and indicating device which will operate accurately over a wide range of temperatures.

It is another object of the present invention to provide a temperature controlling and indicating device having a thermometer as the basic temperature sensing element.

It is a further object of the present invention to provide a temperature controlling and indicating device having a light emitting device disposed on one side of a capillary tube of a thermometer and a light actuated device disposed on the opposite side of said capillary tube, said light actuated device being illuminated by light emitted by said light emitting device when an opaque material in said capillary tube contracts below the level of said light actuated device.

It is still another object of the present invention to provide a temperature controlling and indicating device having a thermometer and a member slidably mounted on said thermometer for providing an electrical output when an opaque material in the capillary tube of said thermometer contracts below the level of said slidably mounted member.

It is still a further object of the present invention to provide a temperature controlling and indicating device having a remote control means for selectively determining a temperature at which said temperature controlling and indicating device will provide an output.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which:

FIGURE 6 is an illustration of a remote temperature control system utilizing the temperature control device of FIGURE 1.

FIGURE 7 is a schematic of a remote temperature indicating system which can be used with the temperature control device of FIGURE 1.

Generally speaking, the present invention is a temperature controlling and indicating device comprising a thermometer having a capillary tube filled with an opaque material and a means adapted thereto for providing an electrical output when the opaque material contracts below a predetermined level. The means adapted to the thermometer is a member having a light emitting device and a light actuated device disposed therein, said member being slidably mounted on the thermometer so as to have said light emitting device on one side of the capillary tube and said light actuated device on an opposite side. There is a circuit means for continually energizing the light emitting device so as to actuate the light actuated device when the opaque material in the capillary tube contracts below the level of said light actuated device. An output circuit is connected to the light actuated device so as to energize a load when said light actuated device is actuated. There is also an optional remote control means for positioning the slidable member on the thermometer so as to selectively determine a temperature at which the load will be energized.

Figure 1:
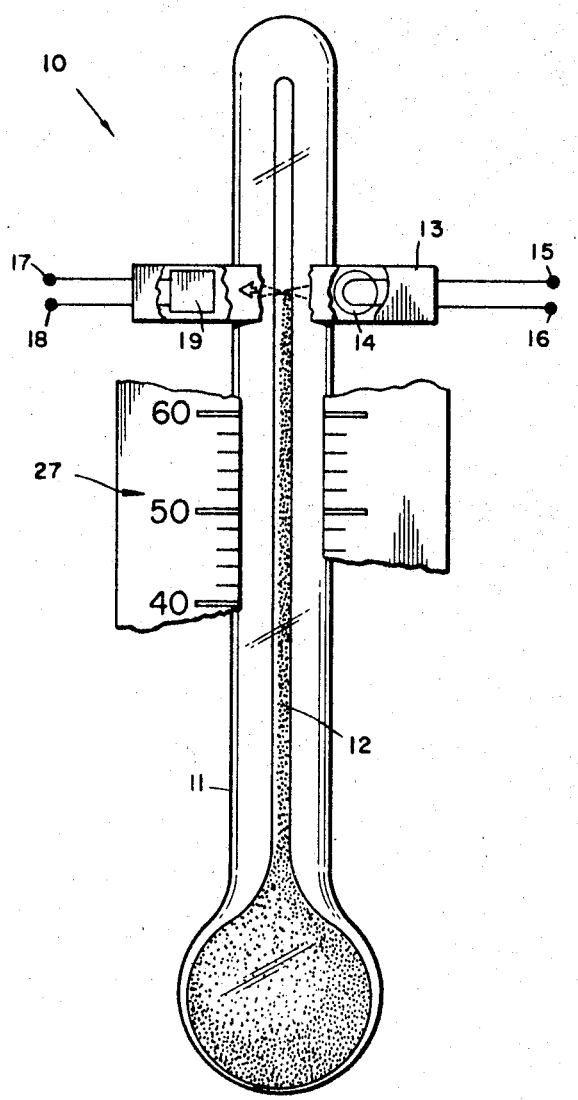
FIGURE 1 is a fragmentary view of one embodiment of the temperature control device of the present invention.

Referring now to the drawing, and particularly to the fragmentary view of FIGURE 1, the components and structure of the present invention can be visualized in conjunction with the following description.

The temperature control device 10 is comprised of the thermometer 11 and a slider assembly 13 containing a light emitting device 14 and a light actuated device 19. The light actuated device 19 is connected to an output circuit for controlling conduction through a load in response to changes in said light actuated device.

The thermometer 11 has a capillary tube 12 filled with an opaque material that will expand and contract in response to temperature changes. The shape of the capillary tube is important in that it must completely prevent light emitted by the light emitting device 14 from striking the light actuated device 19 when the level of the opaque fluid is above a predetermined setting. A thin, substantially rectangularly shaped tube is better for covering the operating area of the light actuated device 19 than a cylindrically shaped tube.

The light emitting device 14 is disposed on one side of the slider assembly 13 and is connected to the terminals 15 and 16. In operation, the terminals 15 and 16 are connected across a power source so as to continually energize the light 14. The light actuated device 19 is disposed in the slider assembly 13 so as to be on the opposite side of the thermometer 11.

The light actuated device 19 may take many forms. For instance, the light actuated device 19 may be diode which will conduct in the presence of light and which will not conduct in the absence of light. The light actuated device 19 can also be a resistor which reduces in value in the presence of light or which increases in value in the presence of light. Therefore, the light actuated device 19 may correctly be referred to as a photoelectric cell.

The slider assembly 13 is adapted to slide up and down the thermometer 11 so as to establish a temperature level at which the light actuated device 19 will be operated. There is a scale means 27 adapted to the thermometer 11 to provide a visual means for setting the slider assembly.

The operation of the temperature control device 10 of FIGURE 1 is very simple. The light 14 is constantly energized through the terminals 15 and 16. When the light emitted by the light 14 strikes the light actuated device 19, there will be an electrical change induced across the terminals 17 and 18.

The temperature at which the temperature control device 10 will operate is established merely by adjusting the slider assembly 13 up and down the thermometer 11. When the ambient temperature is such that the opaque material will block out the light actuated device 19, there will no longer be an output across the terminals 18 and 19. When the temperature drops and the opaque material contracts in the capillary tube 12, the light actuated device 19 will again be actuated by light emitted from the light 14.

FIGURES 2 through 5 are schematics of circuits which can be cooperatively connected to the temperature control device 10 so as to control conduction through a load. The loads may be coolers or heaters or relays or similar devices for operating the coolers or heaters.

Figure 2:
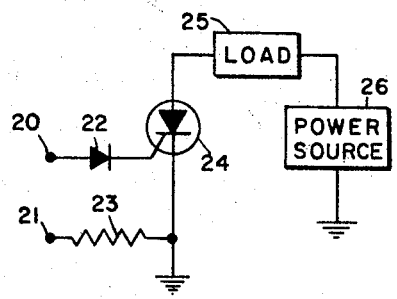
FIGURE 2 is a schematic of one circuit that can be cooperatively connected to the temperature control device of FIGURE 1 so as to conduct current through the load when an output voltage is provided by said device.

Referring to FIGURE 2, it can be seen that there is a power source 26, load 25, the silicon controlled rectifier 24 connected in series to ground. A cathode of a diode 22 is connected to the gate of the silicon controlled rectifier 24. The anode of the diode is connected to a terminal 20. There is a resistor 23 connected between a terminal 21 and the cathode of the silicon controlled rectifier 24.

When the terminals 20 and 21 are connected across the terminals 17 and 18 of the light actuated device 19 shown in FIGURE 1, a voltage produced by said light actuated device will be conducted to the gate of the silicon controlled rectifier 24 to cause said silicon controlled rectifier to permit current flow through the load 25. Therefore, whenever the opaque material in the capillary tube 12 drops below the adjusted level of the light actuated device 19, the load 25 will be energized.

Figure 3:
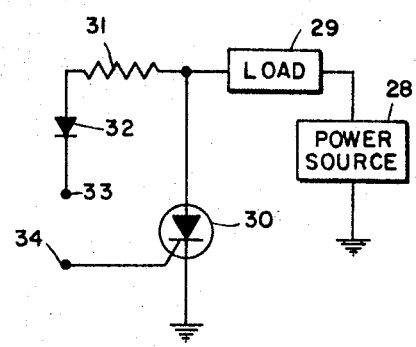
FIGURE 3 is a schematic of another circuit that can be cooperatively connected to the temperature control device of FIGURE 1 so as to conduct current through the load when the impedance between the anode and gate electrode of the silicon controlled rectifier is reduced by said device.

Referring now to FIGURE 3, another circuit for utilizing the output of the temperature control device 10 of FIGURE 1 can be discussed. Again, there is a power source 28, load 29, and silicon controlled rectifier 30 connected in series to ground. A resistor 31 and diode 32 are connected in series between the anode of the silicon controlled rectifier 30 and a terminal 33. The gate of the silicon controlled rectifier 30 is connected to a terminal 34.

When the terminals 33 and 34 are connected across the terminals 17 and 18 of the light actuated device 19, a voltage sufficient to gate on the silicon controlled rectifier 30 will be produced when the impedance of the light actuated device 19 decreases. Therefore, the load 29 will be energized when the opaque material in the capillary tube 12 drops below the adjusted level of the light actuated device 19.

Figure 4:
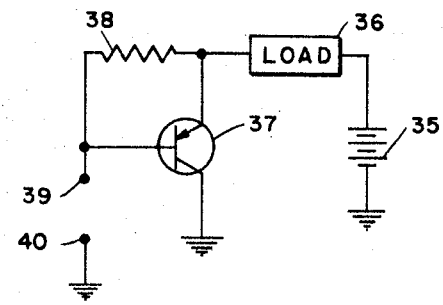
FIGURE 4 is a third schematic of a circuit that can be cooperatively connected to the temperature control device of FIGURE 1 so that the transistor will be biased on to conduct current through the load when the base impedance is reduced by said device.

Referring now to FIGURE 4, a transistor control circuit which can be cooperatively connected to the temperature control device 10 of FIGURE 1 can be discussed. A power source 35, load 36, and emitter-collector circuit of a transistor 37 are connected in series to ground. A resistor 38 is connected between the emiter of the transistor 37 and the base of the transistor 37. The base of the transistor 37 is connected to the terminal 39. A terminal 40, disposed near the terminal 39 is connected to ground.

When the terminals 39 and 40 are connected to the terminals 17 and 18, the transistor 37 will be biased on to permit current flow through the load 36 when a voltage is developed across the terminals 17 and 18 by the light actuated device 19.

Figure 5:
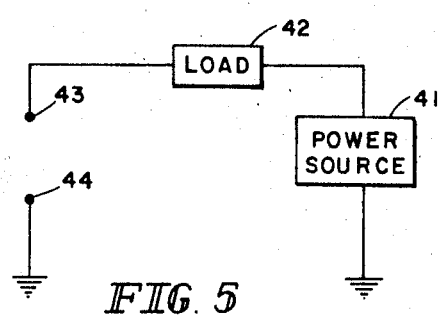
FIGURE 5 is a fourth schematic which can be cooperatively connected to the temperature control device of FIGURE 1 so as to conduct current through the load when the impedance of said device is reduced.

Referring now to FIGURE 5, a simplified control circuit for utilizing the output of the temperature control device 10 of FIGURE 1 can be discussed. It can be seen that a power source 41 and load 42 are connected in series and to the terminal 43. There is a terminal 44, disposed near the terminal 43, which is connected to ground.

When the terminals 43 and 44 are connected to the terminals 17 and 18, current will flow through the load 42 when the impedance of the light actuated device 19 decreases to a predetermined amount. Therefore, the load 42 will be energized when the level of the opaque material contracts below the adjusted level of the light actuated device 19.

Referring now to FIGURE 6, a remote control system based on the temperature control device of the present invention can be discussed.

There is a thermometer 48 which is the basic temperature sensing element of the temperature control device.

A slider assembly 49 containing a light emitting device 50 and light actuated device 51 is adapted to be moved up and down the thermometer 48. The light emitting device 50 is connected to a terminal 50' and to ground so as to be continually energized during operation of the temperature control device. The light actuated device 51 is connected to the terminals 52 and 53. There is a wiper 54 on the slider assembly 49 which makes contact with a temperature compensated rheostat 55 as the slider assembly moves up and down the thermometer 48. The wiper 54 is connected to ground as is shown in FIGURE 6. A threaded shaft 56 is journalled in a pair of support members 57 and 57' which are disposed at opposite ends of the thermometer 48. The threaded shaft 56 is engaged with the slider assembly 49. Since the slider assembly 49 is free to slide on the thermometer 48, rotation of the threaded shaft 56 will move the slider assembly. A reversible, self-starting motor 58 is mounted on the support member 57. There is a gear 59 mounted on the output shaft of the motor 58 so as to be driven thereby. There is a second gear 60 mounted on the threaded shaft 56 so as to impart rotation thereto, said second gear 60 being engaged with the gear 59.

A meter 63 is connected to the rheostat 55 so as to indicate the position of the slider assembly 49 and, consequently, the temperature setting. The meter 63 may be a simple current meter calibrated to provide a position reading. A power source 62 and a voltage regulating circuit consisting of the resistor 64 and diode 65 are connected to the meter 63. The power source 62 is also connected to a double pole-double throw switch 61 and through the emitter-collector circuit of a transistor 68 to a load 71. There is an indicating light connected between the load 71 and ground so as to indicate when the load is being energized. The base of the transistor 68 is connected to a terminal 69. A terminal 70, disposed near the terminal 69, is connected to ground.

The double pole-double throw switch 61 is connected to the motor 58 so as to drive the motor 58 in a first direction when the switch is thrown one way and to drive the motor 58 in a second direction when the switch is thrown the other way. In a remote control system, the switch 61 and meter 63 would be arranged so an operator could adjust the position of the slider assembly 49.

When the terminals 69 and 70 are connected, respectively, to the terminals 52 and 53 of the light actuated device 51, the transistor 68 will be biased on to conduct current through the load 71 when the light actuated device is actuated by light emitted from the light emitting device 50. Therefore, he load 71 will be energized when the opaque material in the thermometer 48 contracts below the adjusted level of the slider assembly 49.

The motor 58, threaded shaft 56, gears 59 and 60, switch 61, and the engaging teeth in the slider assembly 49 are a means for remotely adjusting the position of the slider assembly 49 or the light emitting device 50 and actuated device 51.

The meter 63 and rheostat 55 are a means for remotely determining the position of the slider assembly 49.

Referring now to FIGURE 7, a remote indicating system based on the present invention can be discussed.

The dashed line box 73 represents a slider assembly which can be mounted on a thermometer as shown in FIGURE 1 and FIGURE 6. There is a light emitting device 74 and light actuated device 75 disposed within the slide assembly 73. The light emitting device 74 is connected to the terminal 78 and to ground so as to be continually illuminated in operation. The light actuated device 75 is connected to ground and to a pair of mating connector contacts 76. There is an indicating light 77 connected between the connector contacts 76 and ground so as to be illuminated when the light actuated device 75 is actuated by light emitted from the light emitting device 74.

Depending on the resolution requirements for the temperature control device of the present invention, optical means may be required to focus the light emitted by the light emitting device on a point of the capillary tube. The means and methods for focusing light on a fine point are well known and need not be discussed in this specification. For most applications, a simple slit in the sliding member adjacent to the light emitting device and capillary tube will provide sufficient resolution.

The temperature controlling and indicating device of the present invention, as hereinbefore described in two embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A temperature controlling and indicating device, comprising: a thermometer having a capillary tube filled with an opaque liquid; a slider assembly slidably mounted on said thermometer, said assembly having a light-emitting device disposed therein on one side of said capillary tube and having a light-actuated device disposed therein on an opposite side of said capillary tube; an output circuit connected to said light-actuated device so as to energize a load when said opaque material is below said light-actuated device; means for positioning said assembly along said thermometer, said positioning means including a reversible drive means and a threaded shaft coupled to said drive means and engaging said assembly so as to impart movement thereto; and a rheostat mounted adjacent said thermometer and extending therealong, said rheostat having a wiper arm mounted on said assembly for remote indication of the position of said assembly along said thermometer.

2. A temperature controlling and indicating device as in claim 1 wherein said light-actuated device is a light-sensitive resistor.

3. A temperature controlling and indicating device as in claim 1 wherein said load is a switch means for energizing temperature-controlling elements.

4. A temperature controlling and indicating device as in claim 1 wherein said capillary tube has a thin, substantially rectangular cross section.

5. A temperature controlling and indicating device as in claim 1, further comprising a light connected in circuit with said load so as to indicate when said load is energized.

6. A temperature controlling and indicating device as in claim 1 wherein said output circuit includes a controlled rectifier means for conducting current through said load when said light-actuated device is operated.

7. A temperature controlling and indicating device as in claim 1, further comprising a meter and a voltage source connected to said rheostat so as to indicate remotely the position of said wiper arm along said thermometer.

References Cited

UNITED STATES PATENTS

| | | | |
|---|---|---|---|
| 1,892,165 | 12/1932 | Rudolph | 219—513 X |
| 2,490,627 | 12/1949 | Hofberg | 250—218 X |
| 2,088,385 | 7/1937 | Podbielniak. | |
| 2,096,025 | 10/1937 | Bell | 250—218 X |
| 2,197,190 | 4/1940 | Mott-Smith | 250—218 X |
| 2,419,487 | 4/1947 | Dresser | 340—187 |
| 2,447,847 | 8/1948 | Dresser | 88—14 |
| 2,692,955 | 10/1954 | Lewis | 307—117 |
| 3,206,937 | 9/1965 | Walisch et al. | |
| 3,330,942 | 7/1967 | Whitson | 219—513 X |

ROBERT K. SCHAEFER, *Primary Examiner.*

T. B. JOIKE, *Assistant Examiner.*

U.S. Cl. X.R.

88—14; 219—513; 236—51; 250—218